(12) United States Patent
Nakahashi et al.

(10) Patent No.: US 11,155,398 B2
(45) Date of Patent: Oct. 26, 2021

(54) DISPENSING CONTAINER

(71) Applicants: Kikkoman Corporation, Noda (JP); Hokkaican Co., Ltd., Otaru (JP)

(72) Inventors: Takahiro Nakahashi, Chiyoda-machi (JP); Natsuyuki Mannen, Noda (JP); Denmi Kuwagaki, Noda (JP)

(73) Assignees: Kikkoman Corporation, Noda (JP); Hokkaican Co., Ltd., Otaru (JP)

( * ) Notice: Subject to any disclaimer, the term of this patent is extended or adjusted under 35 U.S.C. 154(b) by 0 days.

(21) Appl. No.: 16/500,478

(22) PCT Filed: Apr. 2, 2018

(86) PCT No.: PCT/JP2018/014073
§ 371 (c)(1),
(2) Date: Oct. 3, 2019

(87) PCT Pub. No.: WO2018/186334
PCT Pub. Date: Oct. 11, 2018

(65) Prior Publication Data
US 2020/0031564 A1 Jan. 30, 2020

(30) Foreign Application Priority Data

Apr. 5, 2017 (JP) .............................. JP2017-075276
Oct. 6, 2017 (JP) .............................. JP2017-196194

(51) Int. Cl.
*B65D 83/00* (2006.01)
*B65D 1/02* (2006.01)
(Continued)

(52) U.S. Cl.
CPC ....... *B65D 83/0061* (2013.01); *B65D 1/0207* (2013.01); *B65D 1/32* (2013.01); *B65D 77/06* (2013.01)

(58) Field of Classification Search
CPC .... B65D 83/0061; B65D 1/0207; B65D 1/32; B65D 77/06
See application file for complete search history.

(56) References Cited

U.S. PATENT DOCUMENTS 9,315,313 B2 4/2016 Kuwagaki et al.
2002/0001686 A1 1/2002 Kashiba et al.
(Continued)

FOREIGN PATENT DOCUMENTS

CA 2916039 A1 12/2014
CN 1942519 A 4/2007
(Continued)

OTHER PUBLICATIONS

International Search Report and Written Opinion for International Application No. PCT/JP2018/014073, dated Jun. 5, 2018.
(Continued)

*Primary Examiner* — Jeremy Carroll
(74) *Attorney, Agent, or Firm* — Wolf, Greenfield & Sacks, P.C.

(57) ABSTRACT

To provide a container including an inner container that is deformed as content decreases, the container being a dispensing container reusable and excellent in an aroma retaining property. To implement such container, a dispensing container (10) includes a container body (13) including a flexible inner container configured to be filled with content and to deflate as the content decreases, and an outer container encompassing the inner container and having an intake hole through which external air is taken into a space between the inner container and the outer container, a discharge cap (15) including a top surface part having a discharge port through which the content is discharged, the discharge cap (15) being mounted on a mouth portion (13a) of the container body (13), and an external air introduction hole that provides communication between the outside and
(Continued)

the intake hole. The inner container and the outer container are made of a polyethylene terephthalate resin.

6 Claims, 10 Drawing Sheets

(51) Int. Cl.
    *B65D 1/32*     (2006.01)
    *B65D 77/06*     (2006.01)

(56) References Cited

U.S. PATENT DOCUMENTS

| | | | |
|---|---|---|---|
| 2003/0168631 | A1 | 9/2003 | Otaki et al. |
| 2005/0181155 | A1 | 8/2005 | Share et al. |
| 2006/0054634 | A1* | 3/2006 | Mekata ............... B65D 83/7535 222/94 |
| 2007/0178268 | A1 | 8/2007 | Matsui et al. |
| 2009/0045222 | A1* | 2/2009 | Nimmo ............... B65D 83/0061 222/95 |
| 2010/0317514 | A1 | 12/2010 | Ohta et al. |
| 2011/0266244 | A1* | 11/2011 | Lustenberger ..... B65D 81/1075 215/6 |
| 2012/0219670 | A1 | 8/2012 | Share et al. |
| 2014/0061244 | A1* | 3/2014 | Kertels ..................... B65B 3/10 222/183 |
| 2014/0190992 | A1 | 7/2014 | Kuwagaki et al. |
| 2016/0304254 | A1* | 10/2016 | Bonekamp ............. B65D 35/10 |
| 2017/0029156 | A1 | 2/2017 | Eguchi et al. |
| 2017/0036802 | A1* | 2/2017 | Taruno ................... B65D 1/023 |
| 2017/0283133 | A1* | 10/2017 | Schulz ................... B65D 1/023 |
| 2017/0283158 | A1* | 10/2017 | Schulz ................... B65D 83/48 |
| 2018/0162580 | A1* | 6/2018 | Nyuu ..................... B65D 25/14 |
| 2020/0062476 | A1 | 2/2020 | Katayama et al. |

FOREIGN PATENT DOCUMENTS

| | | |
|---|---|---|
| EP | 2 272 912 A2 | 1/2011 |
| JP | 2003-335856 A | 11/2003 |
| JP | 2004-231280 A | 8/2004 |
| JP | 2005-015686 A | 1/2005 |
| JP | 2007-522049 A | 8/2007 |
| JP | 2012-101546 A | 5/2012 |
| JP | 5161462 B2 | 3/2013 |
| JP | 2015-067290 A | 4/2015 |
| JP | 2015-145249 A | 8/2015 |
| JP | 2016-159930 A | 9/2016 |
| JP | 2016-193743 A | 11/2016 |
| JP | 2016-210181 A | 12/2016 |
| JP | 2017-030846 A | 2/2017 |
| WO | WO 2005/083003 A2 | 9/2005 |
| WO | 2015/080016 A1 | 6/2015 |
| WO | 2015/080017 A1 | 6/2015 |

OTHER PUBLICATIONS

International Search Report and Written Opinion for International Application No. PCT/JP2018/014072, dated Jun. 19, 2018.
International Preliminary Report on Patentability for International Application No. PCT/JP2018/014073, dated Oct. 17, 2019.
"International Preliminary Report on Patentability for International Application No. PCT/JP2018/014072, dated Oct. 17, 2019.".
"CarlaGolden" Mar. 20, 2016: The Wayback Machine—http://web.archive.org/web/20160320094847/http://www.carlagoldenwellness.com:80/2015/09/28/the-difference-between-soy-sauce-shoyu-and-tamari/ (Year: 2016), 5 pages.
"Kikkoman" published Oct. 3, 2012: The Wayback Machine—http://web.archive.org/web/20121003025031/ http://www.kikkoman.com:80/news/2011 news/06 .shtml (Year: 2012).
Lee et al., Comparative Volatile Profiles in Soy Sauce According to Inoculated Microorganisms. Nov. 7, 2013, Bioscience, Biotechnology, and Biochemistry, 77:11; 2192-2200.
"Yugeta" Mar. 16, 2016: http://web.archive.org/web/20160316024438/ http://yugeta.com:80/shohi n/post_ 133 .html http://web.archive.org/web/20160314215538/http:l/yugeta.com/shohin/nama.html (Year: 2016), 6 pages.
Tadahiko Katsura, Recent Trrends in Gas-barrier Films and PETBottles. Lecture Note, Membrane, 29(5), 290-294(2004). With Partial English translation.

\* cited by examiner

DISPENSING CONTAINER

CROSS-REFERENCE TO RELATED APPLICATIONS

This application is a national stage filing under 35 U.S.C. 371 of International Patent Application No. PCT/JP2018/014073, filed Apr. 2, 2018, which claims priority to Japanese application no. 2017-196194, filed Oct. 6, 2017, and to Japanese application no. 2017-075276, filed Apr. 5, 2017. The entire contents of these applications are incorporated herein by reference in their entirety.

TECHNICAL FIELD

The present invention relates to a dispensing container.

BACKGROUND ART

Conventionally, a dispensing container as disclosed in Patent Literature 1 below has been known, for example. This dispensing container includes: a container body including an inner container that holds contents and deflates as the contents decrease, and an outer container encompassing the inner container and having an intake hole through which external air is taken into a space between the inner and outer containers; a discharge cap mounted on a mouth portion of the container body and having a discharge port through which the contents are discharged; and an external air introduction hole that provides communication between the outside and the intake hole. The discharge cap includes a body tubular member having a topped tubular shape, a pour-out tube communicated with the inside of the body tubular member, and a check valve that switches to provide and cut off communication between the inside of the body tubular member and the inside of the pour-out tube.

RELATED ART REFERENCES

Patent Document

Patent Document 1: Japanese Patent Laid-open No. 2004-231280

SUMMARY OF INVENTION

Technical Problem

However, since most of the conventional dispensing containers are made of PP (polypropylene), it is difficult to reuse (recycle) the dispensing containers. It has been found that the conventional dispensing containers cannot clearly show colors of contents as they are (aesthetics) and is inferior in performance for retaining aroma of the contents (an aroma retaining property).

Therefore, an object of the present invention is to provide a container including an inner container that is deformed as content decreases, the container having such aesthetics that a color of the content can be directly and clearly shown, being reusable (recyclable), and being excellent in an aroma retaining property.

Solution to Problem

A dispensing container according to an aspect of the present invention is a dispensing container in which a container having an at least double-layered structure is configured to be filled with content, the container being made of a polyethylene terephthalate resin.

A dispensing container according to another aspect of the present invention includes:

a container body including a flexible inner container configured to be filled with content and to deflate as the content decreases, and an outer container encompassing the inner container and having an intake hole through which external air is taken into a space between the inner container and the outer container;

a discharge cap including a top surface part having a discharge port through which the content is discharged, the discharge cap being mounted on a mouth portion of the container body; and an external air introduction hole that provides communication between the outside and the intake hole.

The inner container and the outer container are made of a polyethylene terephthalate resin.

The dispensing containers according to the aspects can be reused because the dispensing containers are a type of a so-called PET container and have such aesthetics that a color of the content can be directly and clearly shown. Compared with the conventional dispensing containers, performance for retaining aroma of the content, that is, an aroma retaining property is improved.

In the dispensing container, one or both of the inner container and the outer container may be made of a polyethylene terephthalate resin having an oxygen absorber.

The content of the dispensing container may be liquid food.

The content of the dispensing container may be a soy sauce containing seasoning.

Advantageous Effects of Invention

According to the present invention, it is possible to provide a dispensing container including an inner container that is deformed as content decreases, the container having such aesthetics that a color of the content can be directly and clearly shown, being reusable (recyclable), and being excellent in an aroma retaining property.

DESCRIPTION OF EMBODIMENTS

The following describes a dispensing container according to an embodiment of the present invention with reference to the accompanying drawings.

First Embodiment

Figure 1:
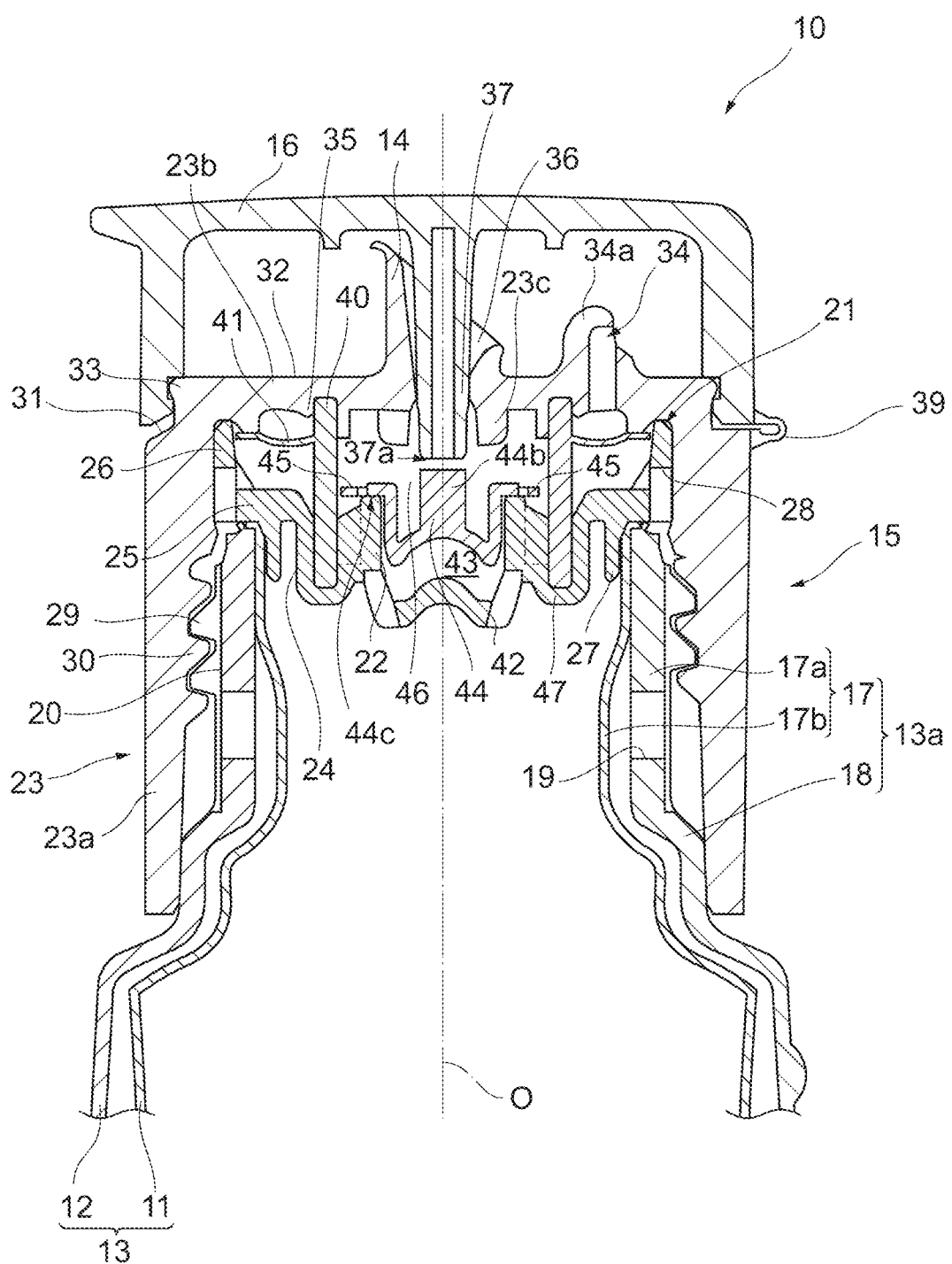
FIG. 1 is a longitudinal sectional view of illustrating, in an enlarged manner, part of a dispensing container in which a circulation allowable groove is formed at part of a valve element.
Figure 5:
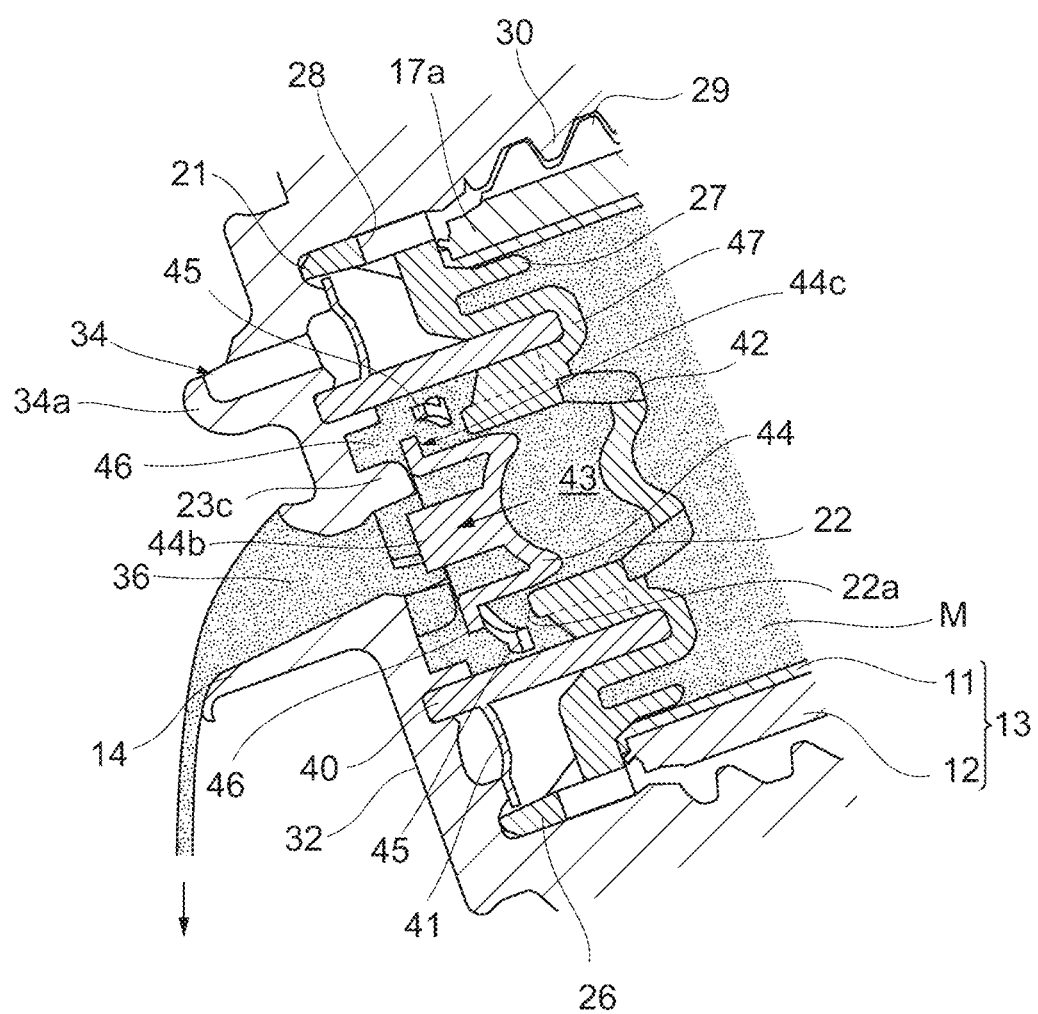
FIG. 5 is a longitudinal sectional view for description of effects of the dispensing container illustrated in FIG. 1.
Figure 8:
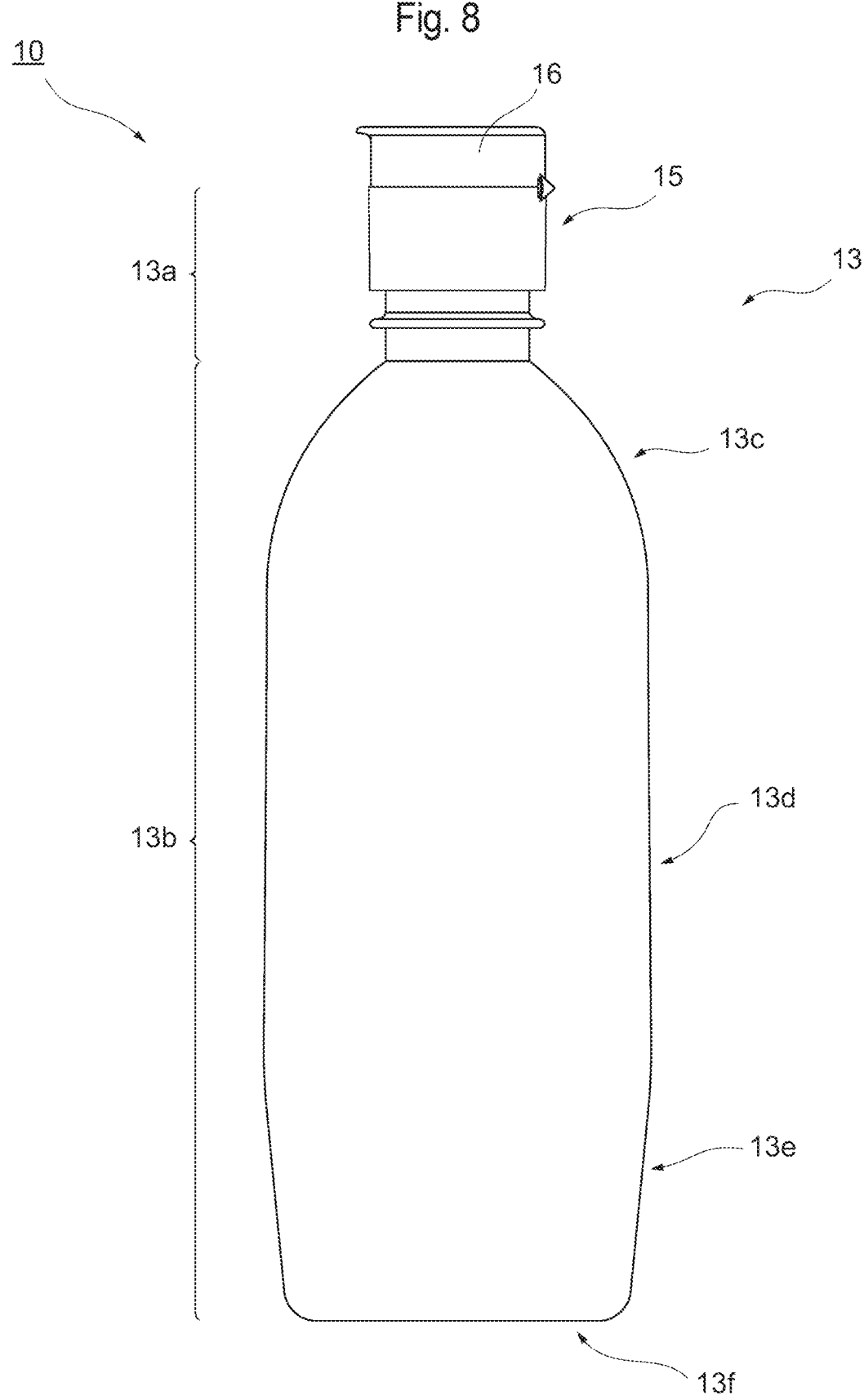
FIG. 8 is an overall view illustrating an exemplary dispensing container.

A dispensing container 10 includes: a container body 13 including an inner container 11 that holds a content M (refer to FIG. 5) and deflates as the amount of the content M decreases and an outer container 12 that is elastically deformable and encompasses the inner container 11; a discharge cap 15 that is mounted on a mouth portion 13a of the container body 13 and has a discharge port 14 through which the content M is discharged; and an upper cap 16 that is detachably disposed on the discharge cap 15 (refer to FIGS. 1 and 8, for example).

The container body 13 of the dispensing container 10 includes the mouth portion 13a and a body portion 13b. The body portion 13b includes a shoulder part 13c, a waist part 13d, a lower body part 13e, and a bottom part 13f (refer to FIG. 8, for example).

The container body 13 is formed in a bottomed tubular shape, and the upper cap 16 is formed in a topped tubular shape. The central axes of the container body 13 and the upper cap 16 are aligned with a common axis when the container body 13 is lidded with the upper cap 16. Hereinafter, this common axis is referred to as a container axis O, a side closer to the upper cap 16 in the direction of the container axis O is referred to as an upper side, a side closer to the bottom part 13f of the container body 13 is referred to as a lower side, a direction orthogonal to the container axis O is referred to as a radial direction, and a direction orbiting about the container axis O is referred to as a circumferential direction.

The container body 13 is what is called a delamination bottle in which the inner container 11 is laminated on the inner surface of the outer container 12 in a delaminatable manner. In the present embodiment, the inner container 11 and the outer container 12 are both made of a polyethylene terephthalate resin. With this configuration, the dispensing container 10 according to the present embodiment can be reused (recycled) after use unlike a conventional dispensing container made of PP or the like, which needs to be discarded, and has such aesthetics that the color of the content M can be directly and clearly shown. When the discharge cap 15 is not made of a polyethylene terephthalate resin, the container body 13 from which the discharge cap 15 is removed as needed at a stage of a recovery process is reused.

The dispensing container 10 according to the present embodiment, in which the inner container 11 and the outer container 12 are both made of a polyethylene terephthalate resin, is excellent in the capability of holding the aroma of the contents, in other words, has an excellent aroma retaining property as compared to the conventional dispensing container made of PP or the like as described in the following embodiment.

The inner container 11 needs to have a small thickness to efficiently discharge the contents when the inner container 11 and the outer container 12 are made of a polyethylene terephthalate resin. In the present embodiment, the thickness of the inner container 11 is equal to or smaller than $2/3$ to $1/6$, preferably $1/2$ to $1/4$ approximately, of the thickness of a normal PET container (the thickness of the PET bottle (container) differs depending on the purpose of use or a site and is, for example, 0.2 to 0.3 mm approximately in a case of a 1 L soy sauce PET bottle). Exemplary numerical values thereof are 0.03 to 0.2 mm, preferably 0.04 to 0.15 mm, and more preferably 0.05 to 0.10 mm. With this configuration, the inner container 11 is laminated on the inner surface of the outer container 12 in a delaminatable manner, and is flexible so that the container can be filled with contents and deflate as the amount of the contents decrease. Accordingly, in the present embodiment, a reusable PET dispensing container (PET delamination container) is achieved.

When, as described above, the thickness of the inner container 11 is $2/3$ to $1/6$, preferably $1/2$ to about $1/4$ or less, of the thickness of a normal PET container, or is 0.03 to 0.2 mm, preferably 0.04 to 0.15 mm, and more preferably 0.05 to 0.10 mm in numerical values so that the flexibility can be achieved, the inner container 11 has oxygen permeability, and the function (oxygen barrier function) of preventing oxygen permeation potentially becomes insufficient. To avoid this, the inner container 11 is made of a polyethylene terephthalate resin containing an oxygen absorber in the present embodiment. The outer container 12 may be made of a polyethylene terephthalate resin containing an oxygen absorber. In this case, the outer container 12 may be made of a polyethylene terephthalate resin containing an oxygen absorber in place of the inner container 11, or the inner container 11 and the outer container 12 may be both made of a polyethylene terephthalate resin containing an oxygen absorber. In the latter case, the barrier function can be achieved more strongly.

<About the Oxygen Absorber>

As described above, the polyethylene terephthalate resin may have an oxygen absorber to further improve the storage stability of the content M. The oxygen absorber is not particularly limited but only needs to be disposed inside or on the surface the polyethylene terephthalate resin, and may be, for example, an oxygen absorber (also referred to as a polyamide/transition metal catalyst oxygen absorber) containing a polyamide material and a deoxygenation material as disclosed in Japanese Patent No. 5161462 (International Publication No. WO 2005/083003). Any other well-known inorganic oxygen absorber (for example, reduced iron or sodium sulfite) or an organic oxygen absorber (for example, ascorbic acids, ethylenic unsaturated hydrocarbon/transition metal catalyst, or cyclohexene side chain containing polymer/transition metal catalyst) may be used. The oxygen absorber is preferably impregnated in the resin. The kind and amount to be mixed of the oxygen absorber may be appropriately selected by the skilled person in the art in accordance with a desired effect of a barrier function or the like. For example, the polyamide/transition metal catalyst oxygen absorber may be mixed in the polyethylene terephthalate resin at 0.1 to 20% by weight, preferably 1 to 10% by weight, more preferably 1 to 3% by weight.

The polyamide material may be an aromatic polyamide or an aliphatic polyamide. The polyamide material may be a homopolymer material or a copolymer amide material. The aromatic polyamide may be a homopolymer or copolymer.

A preferable kind of the polyamide material is MX nylon. The MX nylon is a polymer containing at least 70 mol of a structural unit obtained from a xylylene diamine mixture containing m-xylylene diamine alone or m-xylylene diamine and p-xylylene diamine in an amount smaller than 30% of the entire material and containing an α,ω-aliphatic dicarboxylic acid having 6 to 10 carbon atoms.

Examples of the MX polymer include homopolymers such as poly-m-xylylene adipamide and poly-m-xylylene sebacamide, copolymers such as an m-xylylene/p-xylylene adipamide copolymer, an m-xylylene/p-xylylene piperamide copolymer and an m-xylylene/p-xylylene azelamide copolymer, and a copolymer of the above homopolymer or copolymer component with an aliphatic diamine such as hexamethylenediamine, a cyclic diamine such as piperazine, an aromatic diamine such as p-bis(2-aminoethyl)benzene, an aromatic dicarboxylic acid such as terephthalic acid, an ω-amino carboxylic acid such as ε-caprolactam, ω-aminoheptane acid, or an aromatic aminocarboxylic acid such as p-aminobenzoic acid. The MX polymer may be optionally used in combination with a polymer such as nylon 6, nylon 66, nylon 610, or nylon 11.

A particularly preferable aromatic polyamide is, for example, a polymer formed by polymerization of meta-xylylenediamine ($H_2NCH_2$-m-$C_6H_4$—$CH_2NH_2$) and adipic acid ($HO_2C(CH_2)_4CO_2H$), and is a product manufactured and sold in the name of MXD6 by Mitsubishi Gas Chemical Company, Inc. in Japan. Various kinds of grades of MXD6, such as Grades 6001, 6007, and 6021 may be used. A preferable aliphatic polyamide material is nylon 66. Other appropriate polyamides include GRIVORY (registered trademark) (for example, GRIVORY (registered trademark) G16 and G21, which are copolyamides containing a linear aliphatic unit and a cyclic aromatic component and can be obtained from EMS-Chemie Inc.), and VERSAMID (registered trademark) (aliphatic polyamide typically used as ink resin, which can be obtained from Cognis Corporation).

A preblend contains a deoxygenation material in addition to diluent polyester and polyamide material. The preblend is present at about 20 ppm to about 2000 ppm, preferably about 50 ppm to about 1500 ppm, with respect to the weight of the deoxygenation material. In a more preferable embodiment, the preblend preferably contains the deoxygenation material at about 100 ppm to about 1000 ppm with respect to the weight of the preblend material.

The deoxygenation material may be, for example, a metal selected from the first, second and third transition columns of the periodic table, a complex, or a salt.

The metals usable as the deoxygenation material include iron, cobalt, copper, manganese, zinc, nickel, ruthenium, rhodium, palladium, osmium, iridium, and platinum. Examples of the deoxygenation material also include aluminum powder, aluminum carbide, aluminum chloride, cobalt powder, cobalt oxide, cobalt chloride, antimony powder, antimony oxide, antimony triacetate, antimony chloride III, antimony chloride V, iron, electrolytic iron, iron oxide, platinum, platinum on alumina, palladium, palladium on alumina, ruthenium, rhodium, copper, copper oxide, nickel, and nano particles of a mixed metal (that is, cobalt iron oxide nano particles).

Among the above metals, a cobalt, iron, nickel, copper, or manganese compound is a preferable deoxygenation material. In particular, the cobalt compound as a most preferable deoxygenation material typically exists as a metal salt or complex. Anions of the salt may be inorganic or organic. Examples of the anions include halide, in particular, chloride, acetate, stearate, and octoate. Other deoxygenation materials include cobalt bromide (II) and cobalt carboxylate. The cobalt carboxylate can be obtained as cobalt SIC-CATOL (R). The cobalt carboxylate is a solution of cobalt carboxylate of C8 to C10, and the concentration of cobalt (as a metal) is about 10% by weight of the solution.

The disposition and amount of the deoxygenation material in the innermost layer of the container may be determined as appropriate by the skilled person in the art.

The mouth portion 13a of the container body 13 has a double tubular shape including an upper tubular part 17 positioned on the upper side and a lower tubular part 18 positioned on the lower side and having a diameter larger than that of the upper tubular part 17.

A male screw part 29 is formed on the outer peripheral surface of a part (hereinafter referred to as an outer upper cylindrical part) 17a of the upper tubular part 17, which is made of the outer container 12. In addition, an intake hole 19 through which external air is taken into the space between the inner container 11 and the outer container 12 is formed at a part of the outer upper cylindrical part 17a, which is positioned on the lower side of the male screw part 29. A communication groove 20 extending in the direction of the container axis O is formed at a part of the male screw part 29, which is positioned on the upper side of the intake hole 19.

The inner peripheral surface of the outer upper cylindrical part 17a is a cylindrical surface, and a part (hereinafter referred to as an inner upper tubular part) 17b of the upper tubular part 17, which is made of the inner container 11 is laminated on the inner peripheral surface. An upper end part of the inner upper tubular part 17b is folded toward the outer side in the radial direction and disposed on an opening end of the outer upper cylindrical part 17a.

The discharge cap 15 includes an inside plug member 21 closing the mouth portion 13a of the container body 13, and a body tubular member 23 having a topped tubular shape, covering the inside plug member 21, and including the discharge port 14.

The inside plug member 21 includes a plug body 47, an outer peripheral part of which is disposed on an opening end of the mouth portion 13a of the container body 13, and a communication tubular part 22 erected on the plug body 47.

The plug body 47 includes an inner tubular part 24 having a bottomed tubular shape and disposed in the mouth portion 13a of the container body 13 at an interval from the mouth portion 13a, a flange part 25 provided as an extension from the upper end of the inner tubular part 24 toward the outer side in the radial direction and disposed on the opening end of the mouth portion 13a of the container body 13, an outer tubular part 26 extending upward from the outer periphery of the flange part 25, and a middle tubular part 27 extending downward from the flange part 25, surrounding the inner tubular part 24 from the outer side in the radial direction, and fitted in the mouth portion 13a of the container body 13 in a liquid-tight manner.

The inner tubular part 24, the flange part 25, the outer tubular part 26, and the middle tubular part 27 are disposed coaxially with the container axis O. An external air communication hole 28 penetrating in the radial direction and opened downward is formed at a lower end part of the outer tubular part 26.

The communication tubular part 22 is disposed at a bottom wall part of the inner tubular part 24. In addition, a through-hole 42 opened to both the inside of the inner container 11 and of the communication tubular part 22 is provided through the bottom wall part. The through-hole 42 is disposed coaxially with the container axis O and has a diameter smaller than the inner diameter of the communication tubular part 22, and the size of the through-hole 42 in the direction of the container axis O is smaller than the size of the communication tubular part 22 in the direction of the container axis O.

The body tubular member 23 has a topped tubular shape disposed coaxially with the container axis O.

A female screw part 30 screwed with the male screw part 29 of the mouth portion 13a of the container body 13 is formed on the inner peripheral surface of a peripheral wall part 23a of the body tubular member 23. The lower tubular part 18 of the mouth portion 13a of the container body 13 is fitted in an air-tight manner in a lower end part of the peripheral wall part 23a, which is positioned on the lower side of a screw part where the female screw part 30 is formed, and the outer tubular part 26 of the inside plug member 21 is fitted in an upper end part of the peripheral wall part 23a, which is positioned on the upper side of the screw part.

A top wall part 23b of the body tubular member 23 includes an annular lower plate part 31 extending toward the inner side in the radial direction from the upper end of the peripheral wall part 23a, an upper plate part 32 having a diameter smaller than the inner diameter of the lower plate part 31 and disposed on the upper side of the lower plate part 31, and a coupling annular part 33 coupling the inner periphery of the lower plate part 31 and the outer periphery of the upper plate part 32. The lower plate part 31, the upper plate part 32, and the coupling annular part 33 are disposed coaxially with the container axis O.

The upper plate part 32 includes an external air introduction protrusion 34a having an external air introduction hole 34 that provides communication between the inside of the body tubular member 23 and the outside. The upper plate part 32 also includes a reception tubular part 35 extending downward and having an inner diameter equivalent to the inner diameter of the inner tubular part 24 of the inside plug member 21.

In addition, a discharge tube 36, the inside of which serves as the discharge port 14 is provided through the upper plate part 32.

An inner seal tubular part (seal part) 37 extending downward from the upper cap 16 is fitted in the discharge port 14. The discharge port 14 has an axis line direction aligned with the direction of the container axis O.

An externally fitting tubular part 40 as a tubular member externally fitted to the communication tubular part 22 of the inside plug member 21 is disposed between the inside plug member 21 and the body tubular member 23. The externally fitting tubular part 40 is disposed coaxially with the container axis O, and has a lower end part externally fitted to the communication tubular part 22 and fitted in the inner tubular part 24 of the inside plug member 21, and an upper end part fitted in the reception tubular part 35 of the body tubular member 23.

An annular air valve part 41 provided as an extension toward the outer side in the radial direction is formed at a middle part of the externally fitting tubular part 40 in the direction of the container axis O. The air valve part 41 is disposed to cover the space between the reception tubular part 35 and the coupling annular part 33 from below. The air valve part 41 is elastically deformable and switches to provide and cut off communication between the intake hole 19 and the external air introduction hole 34.

The inside plug member 21 includes a communication hole 43 that provides communication between the discharge port 14 and the inside of the inner container 11. The communication hole 43 is made of the inside of the communication tubular part 22 and disposed coaxially with the container axis O. Accordingly, the communication hole 43 has an axis line direction aligned with the direction of the container axis O. In the illustrated example, the communication hole 43 is positioned on the lower side of the discharge port 14, in other words, on the inner side of the inner container 11 in the direction of the container axis O. The inner volume of the communication hole 43 is larger than the inner volume of the discharge port 14.

In the present embodiment, a valve element 44 that is slidably fitted in the direction of the container axis O and elastically displaces in the direction of the container axis O to open and close the communication hole 43 is disposed in the communication hole 43.

The valve element 44 has a bottomed cylindrical shape disposed coaxially with the container axis O, and includes a periphery upper end part as an annular flange part 44a protruding toward the outer side in the radial direction. The valve element 44 (flange part 44a) contacts on an opening surface at the upper end of the communication tubular part 22 to cut off communication between the through-hole 42 and the communication hole 43.

A protrusion part 44b that contacts a lower end part 37a of the inner seal tubular part 37 is formed at a central part of the valve element 44 (refer to FIG. 1).

The periphery upper end of the valve element 44 is positioned on the upper side of the upper end of the communication tubular part 22, and coupled with one end of an elastic coupling piece 45 that couples the valve element 44 and the externally fitting tubular part 40. A plurality, three in the illustrated example, of elastic coupling pieces 45 are provided at intervals in the circumferential direction, and each elastic coupling piece 45 extends in a curved shape in the circumferential direction. The positions of both end parts of each elastic coupling piece 45 in the direction of the container axis O are equivalent to each other.

The valve element 44, the externally fitting tubular part 40, the elastic coupling pieces 45, and the air valve part 41 are integrally shaped.

The elastic coupling pieces 45 elastically deform to allow the valve element 44 to be displaced in the direction of the container axis O (in the present specification, the displacement of the valve element 44 as the elastic coupling pieces 45 elastically deform in this manner is referred to as elastic displacement). When a plurality (in the illustrated example, three) of elastic coupling pieces 45 are provided as in the present embodiment, the elastic coupling pieces 45 are preferably disposed at intervals equal to each other in the circumferential direction. When the elastic coupling pieces 45 are disposed at the equal intervals in this manner, it is possible to assist smooth displacement of the valve element 44 while preventing a state (tilted state) in which the valve element 44 is tilted relative to a surface orthogonal to the container axis O at the elastic displacement (refer to FIG. 7).

Figure 7:
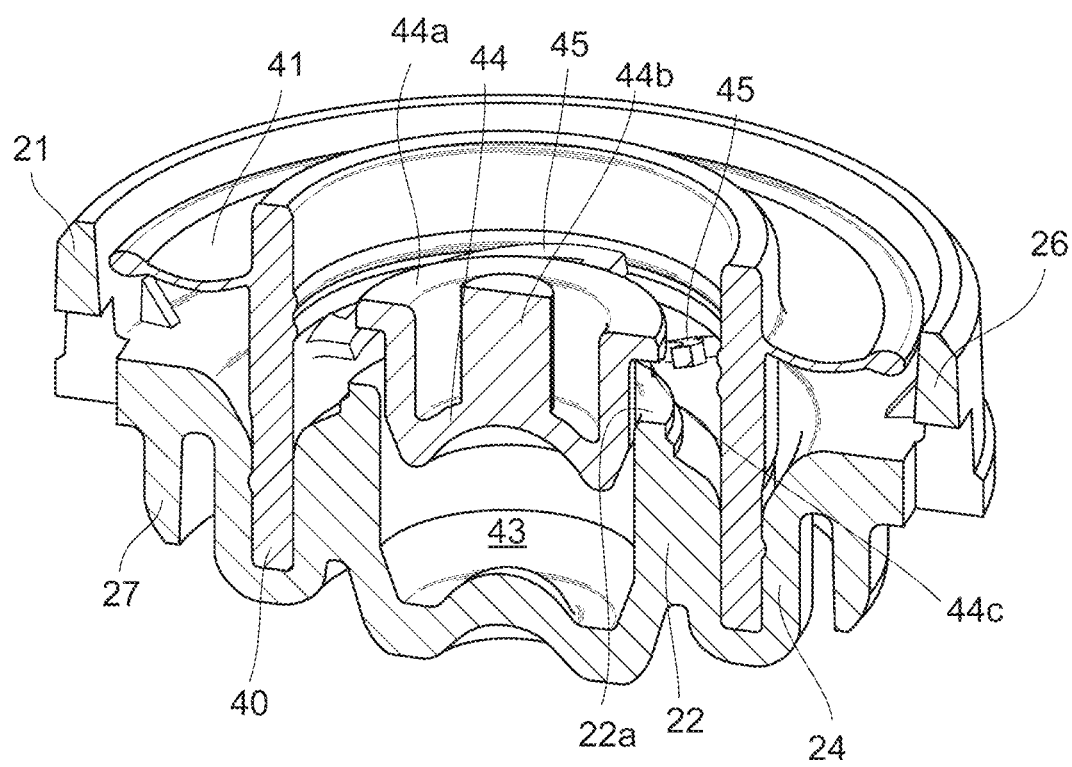
FIG. 7 is a perspective view illustrating an exemplary sectional structure such as a coupling member included in the dispensing container.

When the valve element 44 is elastically displaced, each elastic coupling piece 45 elastically deforms with twist partially added and becomes tilted as a whole (refer to FIG. 7). In this case, the elastic coupling piece 45 itself becomes partially twisted and entirely elongated in accordance with the state, and elastic restoring force of the elastic coupling piece 45 acts as force restoring and displacing (returning) the valve element 44 to a position before the displacement. At the elastic displacement or the restoring displacement, the valve element 44 may rotate in the circumferential direction (clockwise or anticlockwise) about the container axis O.

Each elastic coupling piece 45 according to the present embodiment extends in a curved shape in the circumferential direction as described above, and is simply housed in the narrow gap between the valve element 44 and the externally fitting tubular part 40 (in the present embodiment, between the flange part 44 of the valve element 44 and the inner peripheral surface of the externally fitting tubular part 40) in the initial state of the valve element 44 or a state in which the valve element 44 is restored and displaced toward the inner side of the inner container 11 in the direction of the container axis O.

The dispensing container 10 including the upper cap 16 as in the present embodiment preferably has a structure for avoiding overflow of the content M when the dispensing container 10 is lidded with the upper cap 16. Such a structure will be described below with a specific example.

Figure 2:
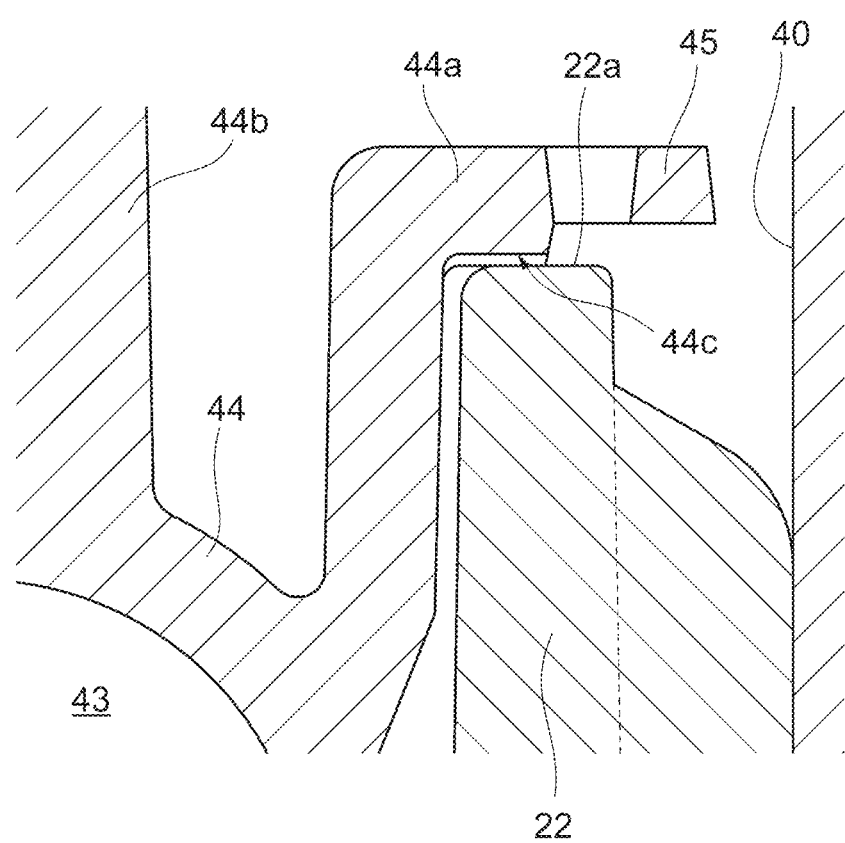
FIG. 2 is a diagram illustrating the circulation allowable groove in FIG. 1 and a peripheral part thereof in a further enlarged manner.

In the dispensing container 10 illustrated in FIG. 1, the annular upper end surface of the communication tubular part 22 contacts the annular flange part 44 a provided to a periphery upper end part of the valve element 44, and functions as a valve seat (valve holder) 22a that receives the valve element 44. In this case, the bottom surface of the valve element 44 may or may not contact a part of the plug body 47, which is positioned on the inner side of the communication tubular part 22 in the radial direction. A circulation allowable groove 44c that allows circulation of the content M is formed at part of a site of the valve element 44, which contacts the valve seat 22a (refer to FIG. 2). The circulation allowable groove 44c is preferably set to have a size with which the content M remaining in an inner space 46 is returned into the inner container 11 after the valve element 44 sits on the valve seat 22a, and the content M closes the circulation allowable groove 44c (prevents air circulation) by surface tension at the final stage. At least part of the content remaining in the inner space 46 may be returned to the inner container through the circulation allowable groove 44c.

The specific shape of the circulation allowable groove 44c and the number thereof are not particularly limited.

Figure 3:
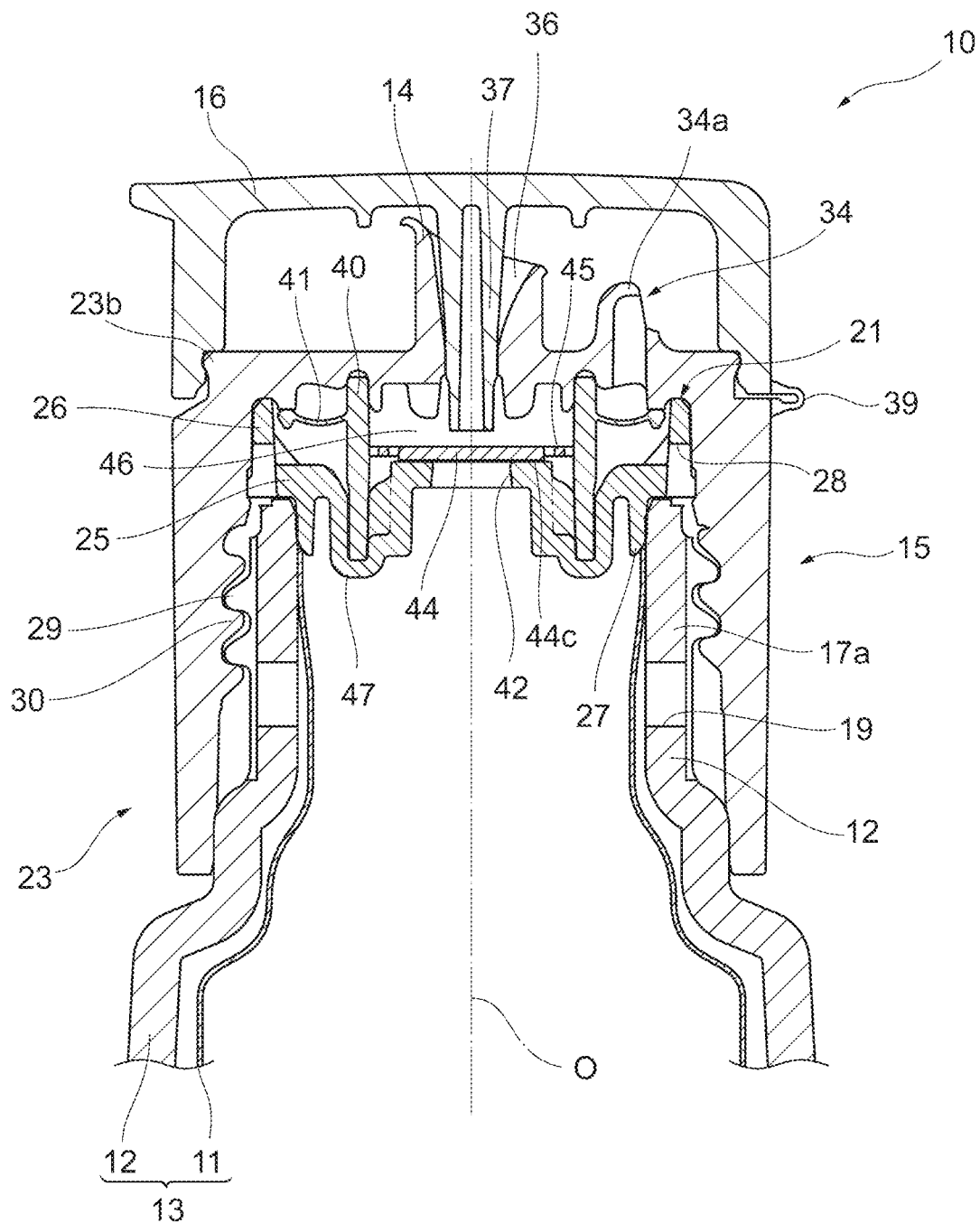
FIG. 3 is a longitudinal sectional view illustrating, in an enlarged manner, part of a dispensing container in which a circulation allowable groove is formed at part of a valve element in a form different from that in FIG. 1.
Figure 4:
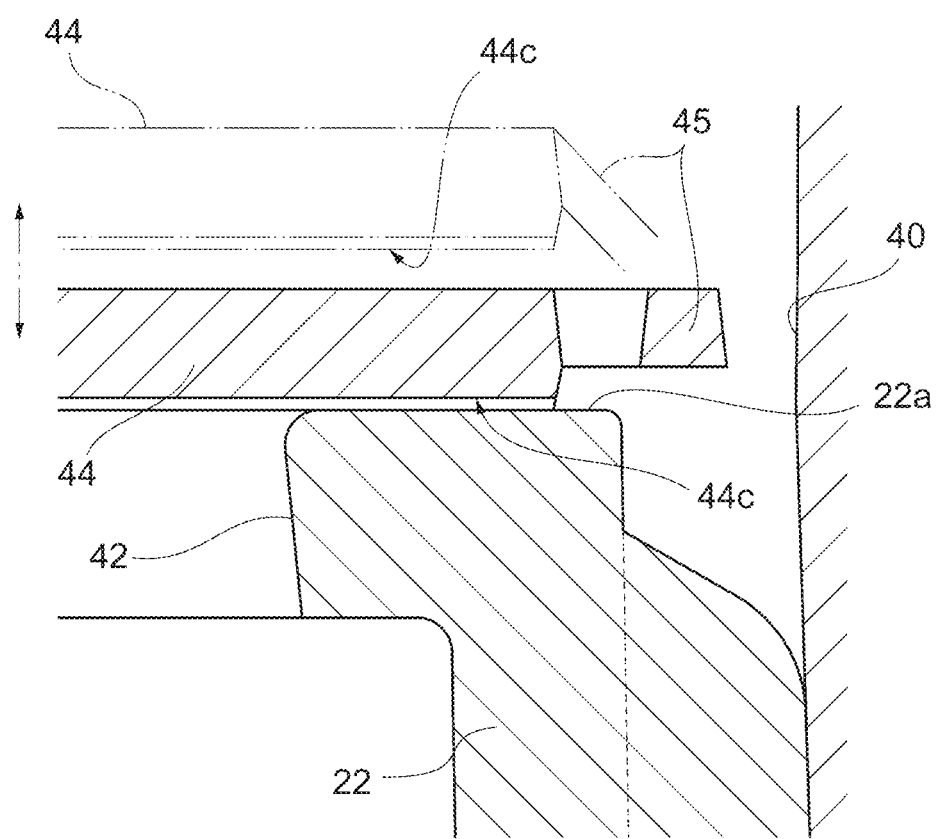
FIG. 4 is a diagram illustrating the circulation allowable groove in FIG. 3 and a peripheral part thereof in a further enlarged manner.

The following describes another example of the circulation allowable groove 44c. In the dispensing container 10 illustrated in FIGS. 3 and 4, the valve element 44 having a flat plate shape and a substantially circular shape in a plan view is employed. The circulation allowable groove 44c that allows circulation of the content M is formed at part of the site of the valve element 44, which contacts the valve seat 22a (refer to FIGS. 3 and 4). The circulation allowable groove 44c is preferably set to have a size with which the content M remaining in the inner space 46 is returned into the inner container 11 after the valve element 44 sits on the valve seat 22a, and the content M closes the circulation allowable groove 44c (prevents air circulation) by surface tension at the final stage. The circulation allowable groove 44c may be provided, for example, in a length equal to the diameter on a straight line between outer edges in the radial direction on the back surface of the valve element 44, or in a length from an outer edge to an optional position at a central part of the back surface.

Typically, when the content M remains at the discharge port, the remaining content M potentially dirties the surrounding by leakage and scattering upon impact application or the like at use again or at storage. In addition, when the upper cap 16 is closed to lid the dispensing container, the content M remaining in the inner space 46 is pushed out the content M by the inner seal tubular part 37 that enters the discharge port 14 for fitting. However, in the dispensing container illustrated in, for example, FIG. 1, the content M accumulating near the discharge port 14 or in the inner space 46 can circulate through the circulation allowable groove 44c and return to the inner container 11 through the through-hole 42. Thus, when the upper cap 16 is closed to lid the dispensing container, it is possible to prevent the inner side of the upper cap 16 and the surface of the discharge cap 15 from becoming dirty due to overflow of the content M.

Although this example specifically describes the configuration in which the circulation allowable groove 44c is provided only to the valve element 44, an additional circulation allowable groove may be provided to the valve seat 22a although not particularly illustrated.

The following describes effects of the dispensing container 10 configured as described above.

To discharge the content M from the dispensing container 10, first, the upper cap 16 is removed from the discharge cap 15. Thereafter, while the dispensing container 10 is tilted to a discharge posture in which the discharge port 14 points downward (refer to FIG. 5), the dispensing container 10 is pushed inward in the radial direction for squeezed deformation (elastic deformation) to achieve volume reduction of the inner container 11 through deformation together with the outer container 12.

Accordingly, the pressure in the inner container 11 rises and the content M in the inner container 11 pushes the valve element 44 through the through-hole 42 to elastically deform the elastic coupling pieces 45 so that the valve element 44 is elastically displaced toward the outside of the inner container 11 in the direction of the container axis O, thereby opening the communication hole 43. Accordingly, the content M in the inner container 11 is externally discharged through the through-hole 42, the communication hole 43, the inside of the externally fitting tubular part 40, and the discharge port 14 (refer to FIG. 5).

Thereafter, when the pushing force on the valve element 44 by the content M in the inner container 11 is reduced by stopping or canceling the pushing of the dispensing container 10, the valve element 44 is restored and displaced toward the inner side of the inner container 11 in the direction of the container axis O by the elastic restoring force of the elastic coupling pieces 45.

Figure 6:
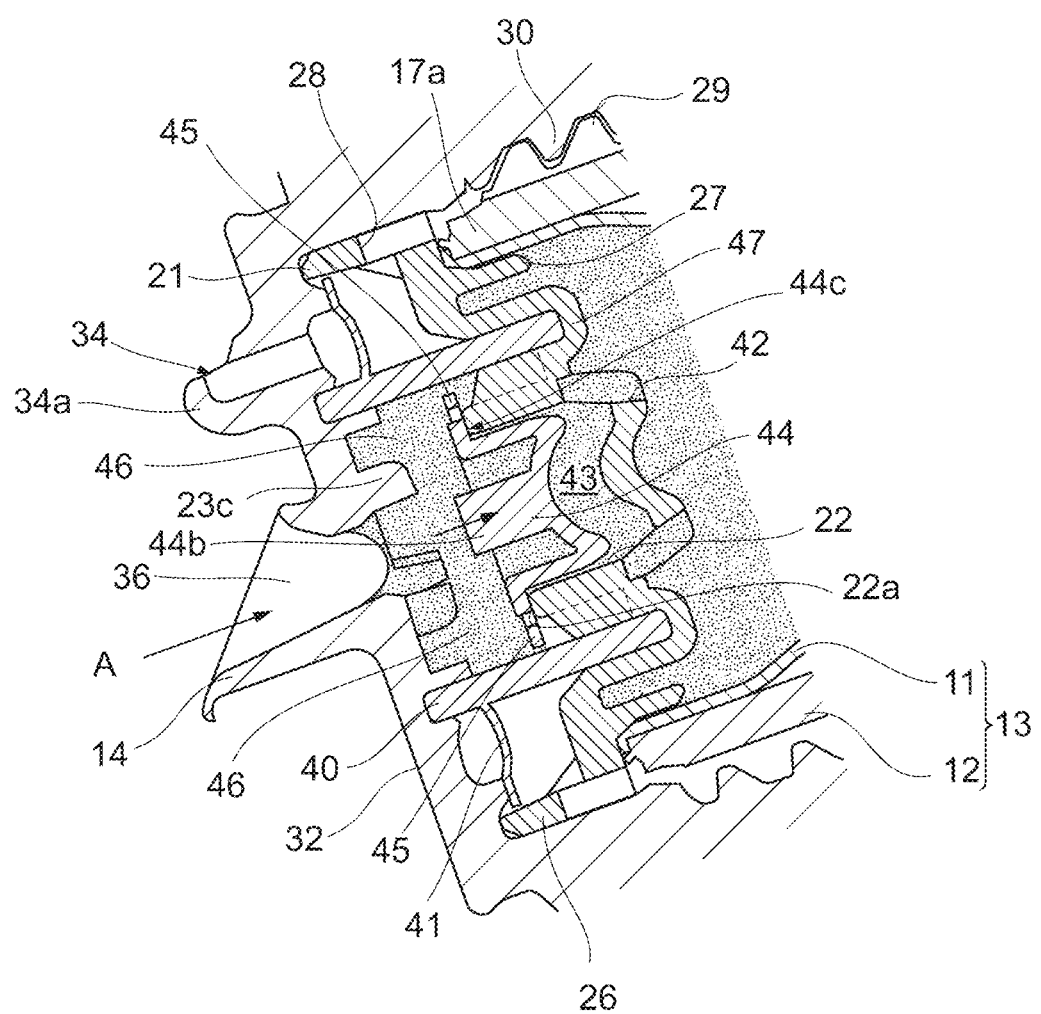
FIG. 6 is a longitudinal sectional view for description of the effects of the dispensing container illustrated in FIG. 1.

In this state, when the valve element 44 enters the communication hole 43 as illustrated in FIG. 6, the outer peripheral surface of the valve element 44 slidably contacts the inner peripheral surface of the communication hole 43 so that the communication hole 43 is closed. Accordingly, the inner space 46 in which the content M not returned to the inner container 11 remains is formed between the body tubular member 23 and the inside plug member 21. The inner space 46 is communicated with the discharge port 14, and its communication with the communication hole 43 is cut off by the valve element 44 functioning as part of a partition wall.

Then, after the inner space 46 is formed in this manner, the inner volume of the inner space 46 increases along with the restoring displacement of the valve element 44 as the valve element 44 is continuously restored and displaced and slides in the communication hole 43 in the direction of the container axis O. Accordingly, the content M in the discharge port 14 can be sucked into the inner space 46, and air A can be sucked from the outside into the discharge port 14.

Then, when the pushing of the container body 13 is canceled while the communication hole 43 is closed by the valve element 44, the outer container 12 is deformed and restored with the inner container 11 deformed by volume reduction. In this case, negative pressure occurs between the inner container 11 and the outer container 12 and acts on the air valve part 41 through the intake hole 19, thereby opening the air valve part 41. Accordingly, external air is taken into the space between the outer container 12 and the inner container 11 through the external air introduction hole 34, the external air communication hole 28, the communication groove 20, and the intake hole 19. Then, when the internal pressure of the space between the outer container 12 and the inner container 11 increases to atmospheric pressure, the air valve part 41 is deformed and restored to cut off the intake hole 19 from the outside. Accordingly, the shape of the inner container 11 with reduced volume is maintained after the content M is discharged.

Any remaining content M in the inner space 46 when the valve element 44 sits on the valve seat 22a to achieve closing can return into the inner container 11 through the circulation allowable groove 44c and the gap between the outer peripheral surface of the valve element 44 and the inner peripheral surface of the communication tubular part 22. In addition, the content M closes the circulation allowable groove 44c by surface tension at the final stage, thereby preventing air circulation.

In this state, when the outer container 12 of the container body 13 is deformed by squeezing again, the internal pressure of the space between the outer container 12 and the inner container 11 becomes positive since the air valve part 41 is cut off, and this positive pressure deforms the inner container 11 through volume reduction so that the content M is discharged by the above effect.

When the pushing of the dispensing container 10 is stopped and canceled before the communication hole 43 is closed by the valve element 44 after the content M is discharged, the inner container 11 becomes deformed and restored, following the outer container 12. Accordingly, the pressure in the inner container 11 decreases and negative pressure occurs, and thus the valve element 44 is smoothly displaced and restored toward the inner side of the inner container 11 in the direction of the container axis O as the negative pressure acts on the valve element 44.

As described so far, the dispensing container 10 according to the present embodiment has such aesthetics that the color of the content M can be directly and clearly shown and can be reused (recycled) after use since the inner container 11 and the outer container 12 are both made of a polyethylene terephthalate resin. In addition, the dispensing container 10 according to the present embodiment has an excellent aroma retaining property (capability of holding aroma of the content) as compared to the conventional dispensing container made of PP or the like.

According to the dispensing container 10 according to the present embodiment, after the content M is discharged, the content M in the discharge port 14 can be sucked into the inner space 46 and air A can be sucked from the outside into the discharge port 14, and thus the content M not returned to the inner container 11 can be prevented from remaining in the discharge port 14. Accordingly, it is possible to prevent leakage of the content M from the discharge port 14 after the content M is discharged.

Since the through-hole 42 has a diameter smaller than that of the communication hole 43, the valve element 44 contacts the part of the plug body 47, which is positioned on the inner side of the communication tubular part 22 in the radial direction, when the valve element 44 is unintentionally displaced toward the inner side of the inner container 11 in the above axis line direction, and thus the displacement of the valve element 44 can be regulated.

Since the upper cap 16 is provided with the inner seal tubular part 37, the content M can be prevented from unexpectedly leaking from the discharge port 14 while the upper cap 16 is closed.

Since the content M not returned to the inner container 11 is unlikely to remain in the discharge port 14 after the content M is discharged as described above, it is possible to prevent, when the upper cap 16 is mounted on the discharge cap 15 and the inner seal tubular part 37 is fitted in the discharge port 14 after the content M is discharged, the content M from being pushed out through the discharge port 14 by the inner seal tubular part 37 and prevent the content M from adhering to the inner seal tubular part 37.

The technical scope of the present invention is not limited to the above embodiment but may be changed in various kinds of manners without departing from the gist of the present invention.

For example, although the above embodiment describes the dispensing container 10 including the air valve part, the present invention is also applicable to a dispensing container including no air valve part. Specifically, for example, in a dispensing container having a double structure and including no air valve part but an extremely narrow external air introduction hole, part or all of the inner container 11 and the outer container 12 of the container body 13 may be made of a polyethylene terephthalate resin.

Although not particularly described in the above embodiment, the dispensing container 10 as described above is applicable when the content M is various kinds of liquid such as liquid food. Specific examples of liquid food include soy sauce containing seasonings such as soy sauce and a soy sauce product, and any other seasonings.

EXAMPLE 1

The container body 13 made of a polyethylene terephthalate resin was experimentally produced, and the actual thicknesses of the inner container 11 and the outer container 12 thereof were measured. The measurement was performed based on an instrument, a measurement method, and other conditions described below.

Instrument: OLYMPUS Magna-Mike 8600

Measurement metal ball: 1/16 IN

Measurement method: although not particularly illustrated in detail, the shoulder part is provided with four ribs (protrusions) in the longitudinal direction, and the thicknesses of the inner container 11 and the outer container 12 were measured at four places on lines along which the ribs extend and at heights separated from each other by 30 mm from the bottom part 13f of the container body 13. The thicknesses of the inner container 11 and the outer container 12 obtained through the measurement were as described below. The thicknesses are in the unit of [mm], and <1> to <4> denote the four places on the lines along which the shoulder part ribs extend. The joining line ("parting line") of a mold is positioned on two of the four ribs, and the remaining ribs are separated from the parting line by 90°. Typically, the thickness of the container is measured with respect to the parting line.

[Thickness of Inner Container]

At the distance of 150 mm from the bottom part: <1> 0.057, <2> 0.075, <3> 0.078, <4> 0.08

At the distance of 120 mm from the bottom part: <1> 0.074, <2> 0.087, <3> 0.099, <4> 0.077

At the distance of 90 mm from the bottom part: <1> 0.067, <2> 0.096, <3> 0.116, <4> 0.073

At the distance of 60 mm from the bottom part: <1> 0.066, <2> 0.09, <3> 0.115, <4> 0.057

At the distance of 30 mm from the bottom part: <1> 0.081, <2> 0.099, <3> 0.123, <4> 0.079

The average value and the standard deviation of the thickness of the inner container over the positions were as follows.

At the distance of 150 mm from the bottom part: Average value 0.073, Standard deviation 0.010536

At the distance of 120 mm from the bottom part: Average value 0.084, Standard deviation 0.011295

At the distance of 90 mm from the bottom part: Average value 0.088, Standard deviation 0.022465

At the distance of 60 mm from the bottom part: Average value 0.082, Standard deviation 0.026038

At the distance of 30 mm from the bottom part: Average value 0.096, Standard deviation 0.020421

[Thickness of Outer Container]

At the distance of 150 mm from the bottom part: <1> 0.253, <2> 0.246, <3> 0.255, <4> 0.263

At the distance of 120 mm from the bottom part: <1> 0.276, <2> 0.256, <3> 0.286, <4> 0.252

At the distance of 90 mm from the bottom part: <1> 0.278, <2> 0.261, <3> 0.297, <4> 0.265

At the distance of 60 mm from the bottom part: <1> 0.245, <2> 0.246, <3> 0.267, <4> 0.343

At the distance of 30 mm from the bottom part: <1> 0.275, <2> 0.27, <3> 0.266, <4> 0.31

The average value and the standard deviation of the thickness of the outer container over the positions were as follows.

At the distance of 150 mm from the bottom part: Average value 0.254, Standard deviation 0.006994

At the distance of 120 mm from the bottom part: Average value 0.268, Standard deviation 0.016197

At the distance of 90 mm from the bottom part: Average value 0.275, Standard deviation 0.016215

At the distance of 60 mm from the bottom part: Average value 0.275, Standard deviation 0.046292

At the distance of 30 mm from the bottom part: Average value 0.280, Standard deviation 0.020172

The thickness distributions of the inner container 11 and the outer container 12 obtained from the above measurement results were as described below.

[Thickness Distribution of Inner Container]

At the distance of 150 mm from the bottom part: Thickness 0.0725

At the distance of 120 mm from the bottom part: Thickness 0.08425

At the distance of 90 mm from the bottom part: Thickness 0.088

At the distance of 60 mm from the bottom part: Thickness 0.082

At the distance of 30 mm from the bottom part: Thickness 0.0955

[Thickness Distribution of Outer Container]

At the distance of 150 mm from the bottom part: Thickness 0.25425

At the distance of 120 mm from the bottom part: Thickness 0.2675

At the distance of 90 mm from the bottom part: Thickness 0.27525

At the distance of 60 mm from the bottom part: Thickness 0.27525

At the distance of 30 mm from the bottom part: Thickness 0.280255

Second Embodiment

Figure 9:
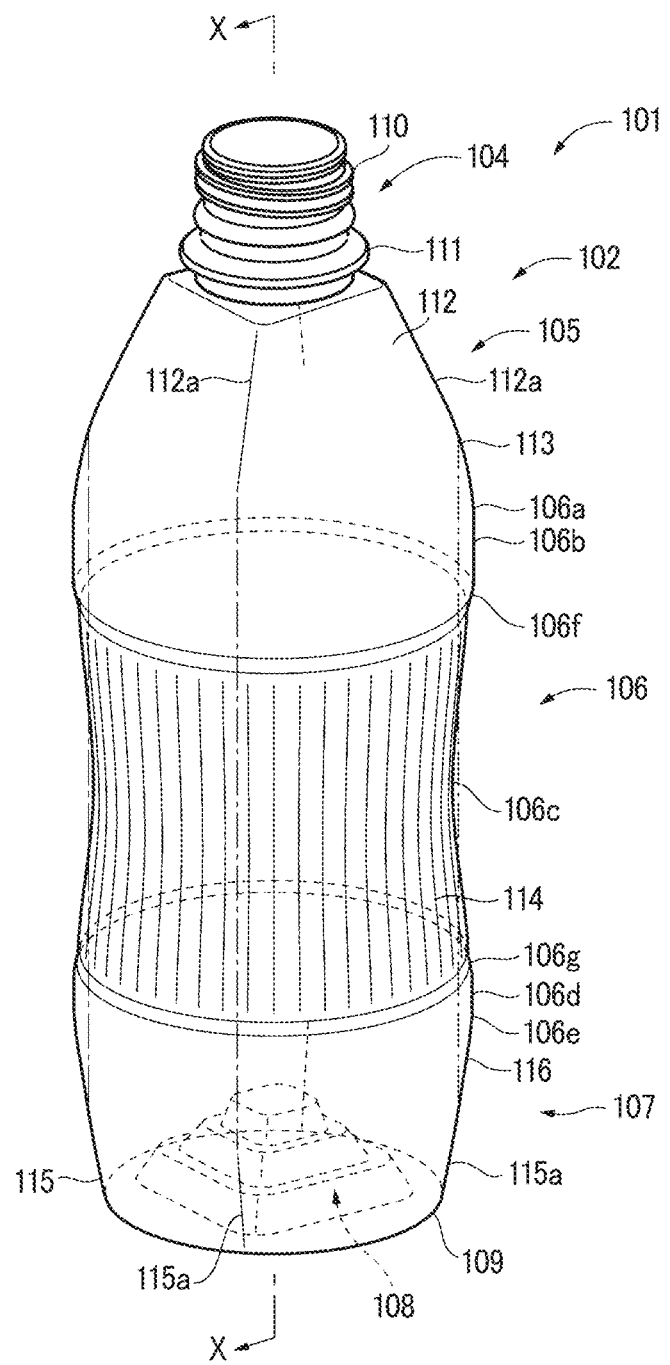
FIG. 9 is a perspective view showing the configuration of a multilayered bottle made of synthetic resin (a dispensing container) according to a second embodiment of the present invention.
Figure 10:
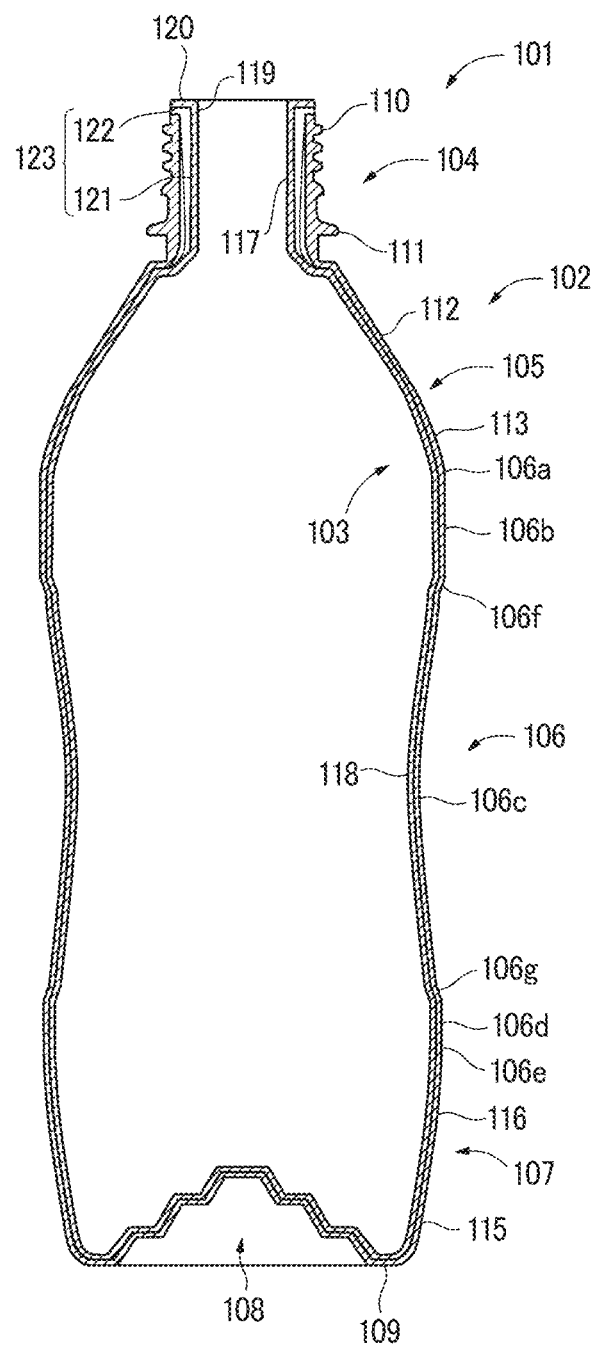
FIG. 10 is a sectional view taken along an X-X line in FIG. 9.

As illustrated in FIG. 9 and FIG. 10, a dispensing container (hereinafter also referred to as "multilayered bottle made of synthetic resin") 101 according to the present embodiment includes an outer shell bottle 102 capable of returning to an original shape thereof against deformation by pressing and an inner container body 103 housed in the outer shell bottle 102 and deformed by pressing. The multilayered bottle made of synthetic resin 101 is used as a container that stores content of, for example, 300 to 1000 milliliters.

Examples of the synthetic resin forming the multilayered bottle made of synthetic resin 101 include synthetic resin mainly composed of polyester formed by aromatic polybasic carboxylic acid and aliphatic polyhydric alcohol. A polyethylene terephthalate resin mainly composed of an ethylene terephthalate chain is particularly suitable. However, the synthetic resin is not limited to the polyethylene terephthalate resin. The synthetic resin mainly composed of polyester has higher toughness as a molecular amount is larger. Therefore, resin at least having peculiar viscosity of 0.7 or more is suitable as the synthetic resin forming the multilayered bottle made of synthetic resin 101. Recycled synthetic resin of resin used as a bottle made of synthetic resin for beverage and food can be used for the outer shell bottle 102 not directly in contact with the content. The multilayered bottle made of synthetic resin 101 having a reduced environmental load can be obtained.

The outer shell bottle 102 includes a cylindrical outer mouth portion 104, a shoulder part 105 gradually expanded in diameter from the lower end part of the outer mouth portion 104, a body part 106 connected to the shoulder part 105, and a bottom part 107 connected to the body part 106 and gradually reduced in diameter. The outer shell bottle 102 includes, on the inner circumference side of the bottom part 107, a bottom surface recessed part 108 that swells to the inner side of the outer shell bottle 102 and gives autonomy to the multilayered bottle made of synthetic resin 101. A part between the bottom part 107 and the bottom surface recessed part 108 is a grounding part 109.

The outer mouth portion 104 includes a male screw part 110 and a support ring 111 on the outer circumferential surface thereof. A part of the shoulder part 105 in contact with the outer mouth portion 104 is formed as a first square pyramid part 112. The shoulder part 105 includes, below the first square pyramid part 112, a body upper part 113 gradually expanded in diameter from the first square pyramid part 112 toward the body part 106 and smoothed at corners of a square pyramid.

The body part 106 includes a first part 106a that is connected to the body upper part 113 and in which the form of the outer shell bottle 102 changes from a diameter expanded form to a non-diameter expanded form, a first straight body part 106b connected to a lower part of the first part 106a and having the same diameter over a predetermined length, a tubular body part 106c connected to the first straight body part 106b, a second straight body part 106d connected to the tubular body part 106c and having the same diameter over a predetermined length, and a non-diameter reduced part 106e in which the second straight body part 106d is connected to the bottom part 107 and that is located at a position before the form of the outer shell bottle 102 changes to a diameter reduced form.

The tubular body part 106c has a circular cross section orthogonal to the axis thereof and is connected to the first straight body part 106b via a step part 106f and, on the other hand, connected to the second straight body part 106d via a step part 106g. The step part 106f is gradually reduced in diameter from the first straight body part 106b toward the tubular body part 106c. The step part 106g is gradually reduced in diameter from the second straight body part 106*d* toward the tubular body part 106*c*.

The tubular body part 106*c* has a Japanese hand drum shape gradually reduced in diameter from the lower end part toward the center of the step part 106*f* and gradually expanded in diameter from the center toward the upper end part of the step part 106*g*. The tubular body part 106*c* includes a plurality of ribs 114 along the axial direction thereof.

A part of the bottom part 107 in contact with the grounding part 109 is formed as a second square pyramid part 115. The bottom part 107 includes, above the second square pyramid part 115, a body lower part 116 gradually expanded in diameter from the second square pyramid part 115 toward the second straight body part 106*d* and smoothed at corners of a square pyramid.

The first and second square pyramid parts 112 and 115 respectively have square shapes in cross sections orthogonal to the axes thereof. The vertexes of the first and second square pyramid parts 112 and 115 are rounded. The first and second square pyramid parts 112 and 115 include ridge lines 112*a* and 115*a* at the vertexes. The ridge lines 115*a* are linked on the extensions of the ridge lines 112*a*.

On the other hand, the inner container body 103 includes a cylindrical inner mouth portion 117 disposed on the inner circumference side of the outer mouth portion 104 and an inner container body main body 118 connected to the inner mouth portion 117 and having a shape extending along the inner surface shapes of the shoulder part 105, the body part 106, the bottom part 107, the bottom surface recessed part 108, and the grounding part 109 of the outer shell bottle 102. The inner mouth portion 117 includes, in an upper part, an extending part 119 extended further upward than the upper end of the outer mouth portion 104 and a brim part 120 projecting outward in the radial direction from the extending part 119. The inner mouth portion 117 is locked to the upper end edge of the outer mouth portion 104 by the brim part 120.

The inner mouth portion 117 includes a longitudinal groove 121 on the outer circumferential surface thereof. The longitudinal groove 121 is connected to a lateral groove 122 formed on the lower surface of the brim part 120. The lateral groove 122 is opened to the outside at the outer circumferential edge of the brim part 120. As a result, a ventilation passage 123 for introducing external air into a space between the outer shell bottle 102 and the inner container body 103 is formed by the longitudinal groove 121 and the lateral groove 122.

In the multilayered bottle made of synthetic resin 101 according to the present embodiment, not-illustrated content is stored in the inner container body 103 during use. On the other hand, a not-illustrated discharge cap with a check valve is attached to a container mouth portion formed by the outer mouth portion 104 and the inner mouth portion 117. In the multilayered bottle made of synthetic resin 101, when the content is discharged, the outer mouth portion 104 and the inner mouth portion 117 are tilted downward and the tubular body part 106*c* of the outer shell bottle 102 is gripped and pressed. Consequently, the inner container body main body 118 is folded and deformed to be reduced in volume without being reduced in surface area, whereby the content is discharged from the inner mouth portion 117 via the check valve.

Subsequently, when the pressing of the tubular body part 106*c* of the outer shell bottle 102 is released, the external air is introduced into a space between the outer shell bottle 102 and the inner container body main body 118 from the ventilation passage 123. The outer shell bottle 102 returns to an original shape thereof with external air pressure. However, the inner container body main body 118 is maintained in a state in which the inner container body main body 118 is deformed through volume reduction by the action of the check valve. As a result, the external air is prevented from intruding into the inside of the inner container body main body 118 from the inner mouth portion 117.

On the other hand, since the external air is introduced into the space between the outer shell bottle 102 and the inner container body main body 118, there is a concern that oxygen or the like in the external air permeates through the inner container body main body 118 and intrudes into the inside.

Therefore, in the multilayered bottle made of synthetic resin 101 according to the present embodiment, 3 to 8% by mass of an oxygen barrier agent is contained in resin constituting the inner container body 103. The inner container body 103 has oxygen permeability with which dissolved oxygen content of distilled water is 3 ppm or less after the inner container body 103 is fully filled the distilled water with dissolved oxygen being removed, the inner mouth portion 117 is then sealed while the ventilation passage between the outer shell bottle and the inner container body is opened, and the distilled water is retained at the temperature of 20° C. for sixty days.

As a result, the multilayered bottle made of synthetic resin 101 can reduce the oxygen in the external air permeating through the inner container body main body 118 and intruding into the inside and can surely prevent content formed by a liquid seasoning including soy sauce stored in the inner container body main body 118 from being deteriorated by the oxygen or the like in the external air.

The oxygen barrier agent desirably contains a polyamide resin and a deoxygenating agent. Examples of the polyamide resin include resin containing polymer including m-xylylene diamine monomer unit, p-xylylene diamine monomer unit, or a mixture of these xylylene diamine monomer units. Examples of the deoxygenating agent include cobalt, iron, nickel, copper, manganese, and a mixture of these kinds of metal or at least one compound selected out of a group including salts or complexes of these kinds of metals. Examples of the oxygen barrier agent include valOR (a product name) manufactured by Valspar Sourcing, Incorporated.

The multilayered bottle made of synthetic resin 101 according to the present embodiment can be manufactured by, for example, disposing, on the inner circumference side of an outer preform obtained by injection molding of a synthetic resin composition mainly composed of polyester formed by aromatic polybasic carboxylic acid and aliphatic polyhydric alcohol, an inner preform obtained by injection molding of a synthetic resin composition mainly composed of the polyester containing the oxygen barrier agent in a range of 3% by mass or more, preferably, 3 to 10% by mass and simultaneously blow-molding the outer preform and the inner preform.

Incidentally, there has been known a multilayered bottle made of synthetic resin in which an inner container body deformed by volume reduction by pressing (hereinafter sometimes referred to as "deformed by volume reduction") is disposed on the inside of an outer shell bottle, which can return to an original shape thereof against deformation by pressing, to allow external air to be introduced into a space between the outer shell bottle and the inner container body (see, for example, Japanese Patent Laid-open No. 2017-065712).

In the multilayered bottle made of synthetic resin, the inner container body is deformed by volume reduction to discharge content stored in the inner container body from a mouth portion and, on the other hand, when the pressing is released, external air is introduced into the space between the outer shell bottle and the inner container body by the action of a separately provided check valve or the like. As a result, the outer shell bottle returns to the original shape with external air pressure and, on the other hand, a state in which the inner container body is deformed by volume reduction is maintained. Then, the external air does not intrude into the inside of the inner container body from the mouth portion. Therefore, it is considered possible to prevent the content stored in the inner container body from being deteriorated by the oxygen or the like in the external air.

However, in the multilayered bottle made of synthetic resin described in the literature described above, there is an inconvenience in that it is likely that the oxygen or the like in the external air introduced into the space between the outer shell bottle and the inner container body when the pressing is released permeates through the inner container body and intrudes into the inside and deteriorates the content.

As such a multilayered bottle made of synthetic resin, a multilayered container in which an outer shell bottle and an inner container body are made of polyethylene has been put to practical use. However, the multilayered container made of polyethylene has a problem in that transparency is poor and it is hard to see content. Further, for soy sauce, a soy sauce containing liquid seasoning, or the like, as measures for suppressing deterioration and degradation of a color tone, aroma, and the like due to intruding oxygen during long-term storage, there is a demand for further improvement of an oxygen barrier property of the multilayered container. Therefore, as a replacement of the multilayered bottle made of polyethylene resin, a multilayered bottle made of polyester resin in which PET resin excellent in an oxygen barrier property and transparency of resin compared with the polyethylene resin is used for an outer shell bottle and an inner container body has been examined.

However, even in the multilayered bottle made of polyester resin, in order to retain aroma or the like of content, suppress decoloring, and obtain excellent storage stability in long-term storage, there is the problem described above if measures are insufficient against the inconvenience that, even if the external air intruding from the mouth portion of the inner container body is blocked and the intrusion of the oxygen from the mouth portion is prevented, the oxygen or the like in the external air introduced into the space between the outer shell bottle and the inner container body when the pressing is released permeates through the inner container body and intrudes into the inside and deteriorates the content. As the multilayered container, there is a demand for a multilayered bottle made of polyester resin with a higher oxygen barrier property.

To cope with such problems under the present situation, in the multilayered bottle made of synthetic resin 101 according to the present embodiment, by pressing and deforming the body part of the outer shell bottle 102, the inner container body 103 is deformed by volume reduction and the content stored in the inner container body 103 is discharged from the inner mouth portion 117. Thereafter, when the pressing of the outer shell bottle 102 is released, the external air is introduced into the space between the outer shell bottle 102 and the inner container body 103 from the ventilation passage 123 and the outer shell bottle 102 returns to the original shape with the external air pressure and, on the other hand, the inner container body 103 is maintained in a state in which the inner container body 103 is deformed by volume reduction. Therefore, in the multilayered bottle made of synthetic resin 101 in the present embodiment, it is possible to prevent the external air from intruding into the inside of the inner container body 103 from the inner mouth portion 117.

In the configurations of the outer shell bottle 102 and the inner container body 103 according to the present embodiment, an active barrier agent can be used as an oxygen barrier agent that can be blended in polyester resin and used and can block and capture oxygen or a publicly-known oxygen barrier agent can be used as a passive barrier agent. In particular, in the present embodiment, it is suitable to use both of polyamide resin and an oxygen capturing agent in the polyester resin constituting the inner container body 103 that stores the content. Amounts of use of the polyamide resin and the oxygen capturing agent need to be appropriately set according to required quality of the content. When content formed of a soy sauce containing liquid seasoning is stored in the multilayered bottle made of synthetic resin 101 according to the present embodiment, in the multilayered bottle made of synthetic resin 101, it is suitable to appropriately blend the oxygen barrier agent in the resin forming the inner container body 103 such that the multilayered bottle made of synthetic resin 101 has oxygen permeability with which dissolved oxygen content of distilled water is 3 ppm or less after the inner container body 103 is fully filled with the distilled water with dissolved oxygen being removed, the inner mouth portion 117 is then sealed while the ventilation passage 123 between the outer shell bottle 102 and the inner container body 103 is opened, the distilled water is retained at the temperature of 20° C. for sixty days.

The multilayered bottle made of synthetic resin 101 according to the present embodiment has oxygen permeability with which dissolved oxygen content of distilled water is 3 ppm or less after the inner container body 103 is fully filled with the distilled water with dissolved oxygen being removed, the inner mouth portion 117 is then sealed while the ventilation passage 123 between the outer shell bottle 102 and the inner container body 103 is opened, and the distilled water is retained at the temperature of 20° C. for sixty days. Therefore, when the pressing of the outer shell bottle 102 is released, even if the external air is introduced into the space between the outer shell bottle 102 and the inner container body 103 from the ventilation passage 123, it is possible to reduce the intrusion of the oxygen or the like in the external air into the inside of the inner container body 103 of the multilayered bottle made of synthetic resin 101.

In the multilayered bottle made of synthetic resin 101 according to the present embodiment, as a result of comparing the dissolved oxygen content in the inner container body 103 between a normal state of use in which the ventilation passage 123 between the outer shell bottle 102 and the inner container body 103 is opened and a state of use only in the inner container body without the outer shell bottle, it has been learned that dissolved oxygen concentration can be retained low for a longer period in the state of use in the multilayered bottle.

As a result, with the multilayered bottle made of synthetic resin 101 according to the present embodiment, it is possible to more surely prevent the content formed of the soy sauce containing liquid seasoning stored in the inner container body 103 from being deteriorated by the oxygen or the like in the external air as long as the content is stored in the multilayered bottle.

When the dissolved oxygen content of the distilled water exceeds 3 ppm, the multilayered bottle made of synthetic resin 101 according to the present embodiment cannot sufficiently reduce or prevent deterioration such as a color tone change due to the oxygen of the liquid seasoning stored on the inside of the inner container body 103.

Since the multilayered bottle made of synthetic resin 101 according to the present embodiment has the oxygen permeability, the oxygen barrier agent is suitably contained in the resin constituting the inner container body 103 in a range of 3% by mass or more, preferably, 3 to 10% by mass.

When the oxygen barrier agent contained in the resin constituting the inner container body 103 is 3% by mass or less, the intrusion of the oxygen in the external air into the inside of the inner container body 103 of the multilayered bottle made of synthetic resin 101 cannot be sufficiently reduced. The oxygen barrier property does not greatly change even if the oxygen barrier agent contained in the resin constituting the inner container body 103 exceeds 10% by mass.

In the multilayered bottle made of synthetic resin 101 according to the present embodiment, the oxygen barrier agent desirably contains a polyamide resin and a deoxygenating agent. The polyamide resin blocks intrusion and passage of the oxygen or the deoxygenating agent combines with the intruding oxygen, whereby the oxygen barrier agent can prevent intrusion of the oxygen in the external air into the inside of the inner container body 103.

In the present embodiment, if the multilayered bottle made of synthetic resin is made of polyester resin, the oxygen barrier agent easily uniformly disperses in the polyester resin constituting the inner container body 103. In conjunction with the oxygen barrier property of the polyester resin, an excellent oxygen barrier effect is exerted.

Examples of the present invention and a comparative example are explained below.

EXAMPLE 2

EXAMPLE 2-1

In this example, the multilayered bottle made of synthetic resin 101 having the shape illustrated in FIG. 9 and FIG. 10 and having content of 500 milliliter was manufactured by disposing, on the inner circumference side of an outer preform obtained by injection molding of a polyethylene terephthalate resin composition, an inner preform obtained by injection molding of a polyethylene terephthalate resin composition containing 3% by mass of an oxygen barrier agent (a product name: valOR A1151J) manufactured by Valspar Sourcing, Incorporated and simultaneously blow-molding the outer preform and the inner preform. The inner container body 103 of the multilayered bottle made of synthetic resin 101 obtained in this example contains 3% by mass of the oxygen barrier agent with respect to the resin constituting the inner container body 103.

Subsequently, the ventilation passage 123 of the multilayered bottle made of synthetic resin 101 obtained in this example was opened, an oxygen concentration measurement sensor chip was stuck to the inner surface of the inner container body main body 118, and the inner container body 103 was then fully filled with distilled water. Subsequently, oxygen dissolved in the distilled water was replaced with an inert gas and the distilled water was retained at temperature of 20° C. for sixty days in a state in which the inner mouth portion 117 was sealed by aluminum foil for heat seal. Thereafter, dissolved oxygen concentration of the distilled water serving as an index of oxygen permeability was measured by a sensor chip attached in advance and set as dissolved oxygen content. This measurement was performed by an oxygen concentration measuring device (a product name: Fibox3-Trace) manufactured by PreSens Precision Sensing GmbH. A result is shown in Table 1.

Subsequently, the ventilation passage 123 of the multilayered bottle made of synthetic resin 101 obtained in this example was opened, the inner container body 103 was then fully filled with soy sauce (manufactured by Kikkoman Corporation), and the soy sauce was retained at temperature of 20° C. for sixty days in a state in which the inner mouth portion 117 was sealed by aluminum foil for heat seal. Thereafter, color tone stability of content was visually evaluated. A result is also shown in Table 1.

EXAMPLE 2-2

In this example, the multilayered bottle made of synthetic resin 101 having the shape illustrated in FIG. 9 and FIG. 10 and having content of 500 milliliters was manufactured in completely the same manner as Example 1 except that an inner preform obtained by injection molding of a polyethylene terephthalate resin composition containing 5% by mass of the oxygen barrier agent used in Example 1 was used. The inner container body 103 of the multilayered bottle made of synthetic resin 101 obtained in this example contains 5% by mass of the oxygen barrier agent.

Subsequently, dissolved oxygen concentration of distilled water serving as an index of oxygen permeability was measured in completely the same manner as Example 1 except that the multilayered bottle made of synthetic resin 101 obtained in this example was used. On the other hand, color tone stability of content was visually evaluated in completely the same manner as Example 1. A result is shown in Table 1.

EXAMPLE 2-3

In this example, the multilayered bottle made of synthetic resin 101 having the shape illustrated in FIG. 9 and FIG. 10 and having content of 500 milliliters was manufactured in completely the same manner as Example 1 except that an inner preform obtained by injection molding of a polyethylene terephthalate resin composition containing 7% by mass of the oxygen barrier agent used in Example 1 was used. The inner container body 103 of the multilayered bottle made of synthetic resin 101 obtained in this example contains 7% by mass of the oxygen barrier agent.

Subsequently, dissolved oxygen concentration of distilled water serving as an index of oxygen permeability was measured in completely the same manner as Example 1 except that the multilayered bottle made of synthetic resin 101 obtained in this example was used. On the other hand, color tone stability of content was visually evaluated in completely the same manner as Example 1. A result is shown in Table 1.

EXAMPLE 2-4

In this example, the multilayered bottle made of synthetic resin 101 having the shape illustrated in FIG. 9 and FIG. 10 and having content of 500 milliliters was manufactured in completely the same manner as Example 1 except that an inner preform obtained by injection molding of a polyethylene terephthalate resin composition containing 8% by mass of the oxygen barrier agent used in Example 1 was used. The inner container body 103 of the multilayered bottle made of synthetic resin 101 obtained in this example contains 8% by mass of the oxygen barrier agent.

Subsequently, dissolved oxygen concentration of distilled water serving as an index of oxygen permeability was measured in completely the same manner as Example 1 except that the multilayered bottle made of synthetic resin 101 obtained in this example was used. On the other hand, color tone stability of content was visually evaluated in completely the same manner as Example 1. A result is shown in Table 1.

EXAMPLE 2-5

In this example, the multilayered bottle made of synthetic resin 101 having the shape illustrated in FIG. 9 and FIG. 10 and having content of 500 milliliters was manufactured in completely the same manner as Example 1 except that an inner preform obtained by injection molding of a polyethylene terephthalate resin composition containing 10% by mass of the oxygen barrier agent used in Example 1 was used. The inner container body 103 of the multilayered bottle made of synthetic resin 101 obtained in this example contains 10% by mass of the oxygen barrier agent. The multilayered bottle made of synthetic resin 101 obtained in this example had a slightly decreasing tendency of transparency of the inner container body 103.

Subsequently, dissolved oxygen concentration of distilled water serving as an index of oxygen permeability was measured in completely the same manner as Example 1 except that the multilayered bottle made of synthetic resin 101 obtained in this example was used. On the other hand, color tone stability of content was visually evaluated in completely the same manner as Example 1. A result is shown in Table 1.

COMPARATIVE EXAMPLE

In this comparative example, the multilayered bottle made of synthetic resin 101 having the shape illustrated in FIG. 9 and FIG. 10 and having content of 500 milliliters was manufactured in completely the same manner as Example 1 except that an inner preform obtained by injection molding of a polyethylene terephthalate resin composition not containing the oxygen barrier agent used in Example 1 at all was used. The inner container body 103 of the multilayered bottle made of synthetic resin 101 obtained in this comparative example does not contain the oxygen barrier agent at all.

Subsequently, dissolved oxygen concentration of distilled water serving as an index of oxygen permeability was measured in completely the same manner as Example 1 except that the multilayered bottle made of synthetic resin 101 obtained in this comparative example was used. On the other hand, color tone stability of content was visually evaluated in completely the same manner as Example 1. A result is shown in Table 1.

TABLE 1

|  | Comparative example | Examples | | | | |
| --- | --- | --- | --- | --- | --- | --- |
|  |  | 1 | 2 | 3 | 4 | 5 |
| Dissolved oxygen concentration of distilled water (ppm) | 7.0 or more | 2.3 | 1.3 | 0.3 | 0.24 | 0.24 or less |
| Color tone stability of content | x to Δ | Δ to ○ | ○ | ○ | ○ | ○ |

Color tone stability of content:
x to Δ . . . discolored,
Δ to ○: slightly discolored,
○: not discolored It is evident from Table 1 that, with the multilayered bottle made of synthetic resin 101 in Examples 1 to 4 having oxygen permeability with which dissolved oxygen content of distilled water is 3 ppm or less after the inner container body 103 is fully filled with the distilled water with dissolved oxygen being removed, the inner mouth portion 117 is then sealed, and the distilled water is retained at the temperature of 20° C. for sixty days, color tone stability of content is excellent and an excellent effect can be obtained concerning prevention of deterioration of content compared with the multilayered bottle made of synthetic resin 101 in the comparative example having dissolved oxygen content of the distilled water exceeding 3 ppm and having oxygen permeability of 7.0 ppm or more.

The invention claimed is:

1. A dispensing container in which a container having an at least double-layered structure is filled with content, the dispensing container comprising:
   a container body including a flexible inner container filled with raw soy sauce as the content, the inner container configured to deflate as the content decreases, and an outer container encompassing the inner container and having an intake hole through which external air is taken into a space between the inner container and the outer container;
   a discharge cap including a top surface part having a discharge port through which the content is discharged, the discharge cap being mounted on a mouth portion of the container body; and
   an external air introduction hole that provides communication between outside and the intake hole, wherein
   the inner container and the outer container are made of a polyethylene terephthalate resin, the polyethylene terephthalate resin forming one or both of the inner container and the outer container incorporates an oxygen absorber therein.

2. The dispensing container according to claim 1, wherein the inner container is made of a polyethylene terephthalate resin blended with an oxygen barrier agent to permit oxygen to permeate so that dissolved oxygen content of distilled water is 3 ppm or less after the inner container is fully filled with the distilled water with dissolved oxygen being removed, an inner mouth portion of the inner container is then sealed while a ventilation passage between the outer container and the inner container is opened, and the distilled water is retained at the temperature of 20° C. for sixty days.

3. The dispensing container according to claim 1, wherein the inner container contains an oxygen barrier agent in a range of 3 to 10% by mass of resin constituting the inner container.

4. The dispensing container according to claim 3, wherein the oxygen barrier agent contains a polyamide resin and a deoxygenating agent.

5. The dispensing container according to claim 1, wherein the content is a raw soy sauce containing seasoning.

6. The dispensing container according to claim 1, wherein the thickness of the inner container is 0.03 mm to 0.2 mm.

* * * * *